(12) United States Patent
Sandofsky et al.

(10) Patent No.: US 11,477,391 B1
(45) Date of Patent: Oct. 18, 2022

(54) GENERATING LONG EXPOSURE IMAGES

(71) Applicant: Lux Optics Incorporated, San Mateo, CA (US)

(72) Inventors: Benjamin Keith Sandofsky, San Mateo, CA (US); Sebastiaan Anne Laurens de With, San Francisco, CA (US)

(73) Assignee: Lux Optics Incorporated, San Mateo, CA (US)

( * ) Notice: Subject to any disclaimer, the term of this patent is extended or adjusted under 35 U.S.C. 154(b) by 0 days.

(21) Appl. No.: 17/244,769

(22) Filed: Apr. 29, 2021

Related U.S. Application Data

(63) Continuation of application No. 16/869,511, filed on May 7, 2020, now Pat. No. 11,039,079.

(60) Provisional application No. 62/844,632, filed on May 7, 2019.

(51) Int. Cl.
*H04N 5/235* (2006.01)
*G06T 5/50* (2006.01)
*G06T 3/00* (2006.01)
*H04N 5/232* (2006.01)

(52) U.S. Cl.
CPC ......... *H04N 5/2353* (2013.01); *G06T 3/0068* (2013.01); *G06T 5/50* (2013.01); *H04N 5/232935* (2018.08); *G06T 2207/20221* (2013.01)

(58) Field of Classification Search
None
See application file for complete search history.

(56) References Cited

U.S. PATENT DOCUMENTS

| | | | |
|---|---|---|---|
| 6,516,154 B1 | 2/2003 | Parulski | |
| 9,836,484 B1 | 12/2017 | Bialynicka-Birula | |
| 2007/0177048 A1* | 8/2007 | Van Dyke | H04N 5/2353 348/E5.037 |
| 2008/0143840 A1 | 6/2008 | Corkum | |
| 2008/0253758 A1* | 10/2008 | Yap | H04N 5/2351 396/234 |
| 2009/0086074 A1 | 4/2009 | Li | |
| 2011/0016476 A1 | 1/2011 | Raju | |
| 2011/0134290 A1 | 6/2011 | Park | |
| 2012/0249844 A1 | 10/2012 | Saito | |

(Continued)

FOREIGN PATENT DOCUMENTS

JP   10142673 A * 5/1998 ............. G03B 17/18

OTHER PUBLICATIONS

JPH10142673A; Ito Naoki; Camera Display Device; Asahi Optical Co Ltd; English Translation; May 1998; pp. 2-6 (Year: 1998).*

(Continued)

*Primary Examiner* — Cynthia Segura
(74) *Attorney, Agent, or Firm* — Van Pelt, Yi & James LLP

(57) ABSTRACT

Video stream data is received. The video stream data comprises a plurality of arriving frames. An indication that the stream data should be processed into a long exposure image is received. In response to receipt of a frame arrival, an attempt to align a current frame with a registration image is made. Based at least in part on at least one of the frame arrival and the attempt to align the current frame with the registration image, a determination is made that feedback should be provided to a user. The feedback is provided to the user.

35 Claims, 5 Drawing Sheets

(56) References Cited

U.S. PATENT DOCUMENTS

| | | | |
|---|---|---|---|
| 2013/0194457 A1* | 8/2013 | Tanaka | H04N 5/3535 |
| | | | 348/239 |
| 2014/0111670 A1 | 4/2014 | Lord | |
| 2015/0262341 A1 | 9/2015 | Nash | |
| 2016/0112637 A1* | 4/2016 | Laroia | H04N 5/2257 |
| | | | 348/221.1 |
| 2016/0182839 A1 | 6/2016 | Shigeta | |
| 2017/0163913 A1 | 6/2017 | Shigeta | |
| 2017/0302840 A1 | 10/2017 | Hasinoff | |
| 2017/0347044 A1 | 11/2017 | Douady-Pleven | |
| 2018/0124343 A1 | 5/2018 | Vogelsang | |
| 2018/0174343 A1 | 6/2018 | Slater | |
| 2018/0234606 A1* | 8/2018 | Pohl | H04N 5/23293 |
| 2018/0316864 A1 | 11/2018 | Molgaard | |
| 2019/0182434 A1 | 6/2019 | Moon | |
| 2019/0370948 A1* | 12/2019 | Tico | G06T 5/009 |
| 2020/0106945 A1* | 4/2020 | Hsieh | H04N 5/2354 |
| 2022/0007040 A1* | 1/2022 | Ward | H04N 5/265 |

OTHER PUBLICATIONS

Jiang et al., Super SloMo: High Quality Estimation of Multiple Intermediate Frames for Video Interpolation, Proceedings of the IEEE Conference on Computer Vision and Pattern Recognition, 2018.

Salamon et al., ShutterApp: Spatio-temporal Exposure Control for Videos, Computer Graphics Forum, 2019, vol. 38, No. 7.

* cited by examiner

GENERATING LONG EXPOSURE IMAGES

CROSS REFERENCE TO OTHER APPLICATIONS

This application is a continuation of U.S. patent application Ser. No. 16/869,511, entitled GENERATING LONG EXPOSURE IMAGES filed May 7, 2020, which claims priority to U.S. Provisional Patent Application No. 62/844,632, entitled GENERATING LONG EXPOSURE IMAGES filed May 7, 2019, each of which is incorporated herein by reference for all purposes.

BACKGROUND OF THE INVENTION

Images are increasingly taken via multipurpose mobile or other devices (e.g., smart phones) as contrasted with traditional, dedicated photographic equipment. One reason for this shift in usage is that mobile devices are virtually ubiquitous (with photographers likely always having such a device available). Another reason is that, as sensor and other technology has improved, the image quality of such devices is now generally considered to rival images captured using traditional photographic equipment. Unfortunately, certain types of photographic subjects/images are easier to capture using traditional photographic equipment.

BRIEF DESCRIPTION OF THE DRAWINGS

Various embodiments of the invention are disclosed in the following detailed description and the accompanying drawings.

DETAILED DESCRIPTION

Figure 1:
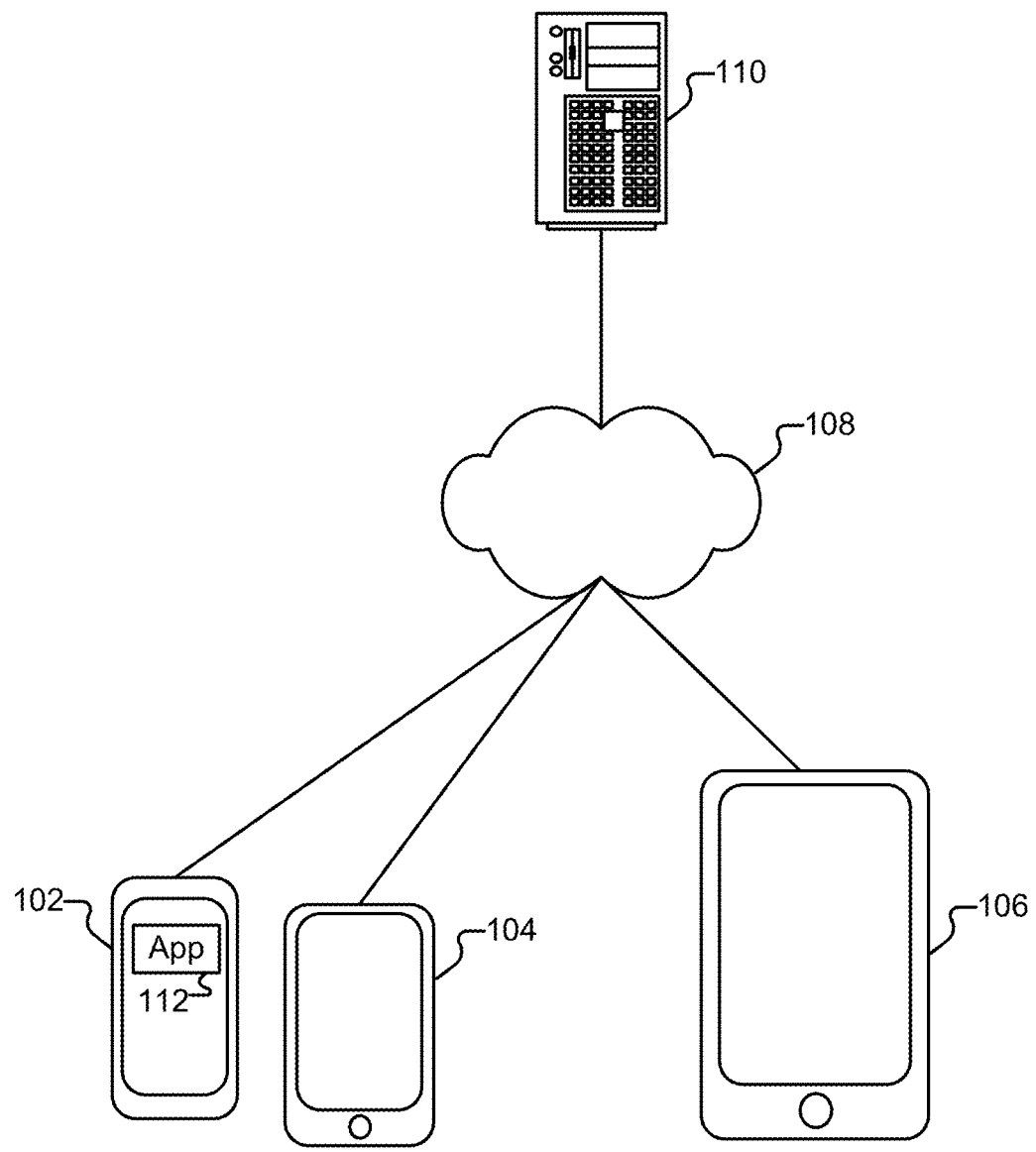
FIG. 1 illustrates an example of an environment in which a variety of mobile devices are configured to create long exposure images.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

Often, when a photographer takes a photograph, the intent is to capture sharp subject details (and freeze any motion occurring in the scene). In order to achieve such a result (e.g., under typical daylight lighting conditions), a short exposure (e.g., $\frac{1}{30}^{th}$ or $\frac{1}{100}^{th}$ of a second) is used. Photographs captured over longer periods (e.g., multiple seconds or longer) are often referred to as "long exposure" photographs.

Long exposure photography can be desirable in a variety of contexts for a variety of reasons, including for practical and artistic effect purposes. In contrast with freezing action (e.g., capturing individual water droplets, pinpointing stars, or preserving athletic moments using a fast exposure), a photographer may instead wish to emphasize the movement of a subject (e.g., photographing a smooth flow of water or trail of stars) through the deliberate use of a blurring effect provided by a longer exposure. Another example use of long exposure photography is as a practical tool. The presence of unwanted transient elements in a scene (such as a stray car or person) can be mitigated through use of long exposure photography. Similarly, a better quality image (e.g., having less noise) can be obtained when pairing a longer exposure at a lower ISO setting than a faster exposure with a higher ISO setting.

One challenge in performing long exposure photography lies in holding the camera as still as possible during the exposure. Holding a camera still for $\frac{1}{30}^{th}$ or $\frac{1}{100}^{th}$ of a second is a relatively straightforward task for most individuals. Unfortunately, even for steady-handed individuals, small involuntary muscle movements are likely to occur during multi-second exposures that will cause unwanted camera motion during exposure. Traditionally, photographers have made use of clamps, tripods, and/or other physical mechanisms to help hold their cameras steady during a long exposure. In an increasingly mobile world, however, carrying around such additional equipment can be cumbersome and/or impractical. Described herein are techniques for creating long exposure imagery, including by an end user handholding a mobile device, which do not depend on the use of tripods or similar extraneous equipment (e.g., mounts).

The techniques described herein can be performed in real-time (i.e., as the scene is optically captured, as contrasted with photo manipulation techniques which operate on previously captured images). Further, feedback can be provided to the user, in real-time, during optical capture. The following are three example scenarios in which example end users may wish to engage in long exposure photography using commodity mobile devices. In each of the scenarios, the user may wish to capture a particular subject by itself, and/or may wish to incorporate themselves (e.g., in a selfie mode). Techniques described herein can also be used in other scenarios as well (e.g., to minimize noise in low light situations).

Scenario 1: Water Features

A user may wish to photograph a water feature (e.g., a fountain, waterfall, stream, etc.). Using techniques described herein, the user can create an image in which moving water appears as silky smooth.

Scenario 2: Minimizing Unwanted Transient Elements

A user visiting a popular tourist destination may wish to photograph a landmark (e.g., a statue or building). Using techniques described herein, the user can create an image that mitigates the presence of unwanted elements (e.g., other tourists, car traffic, etc.) obstructing the view of the landmark.

Scenario 3: Light Trails

A user may wish to create artistic images that incorporate fireworks, city lights, automotive lights, etc. Using techniques described herein, the user can create such images.

Example Environment and Mobile Device Embodiments

FIG. 1 illustrates an example of an environment in which a variety of mobile devices are configured to create long exposure images. As shown, client devices 102 and 104 are mobile telephony devices, and client device 106 is a tablet computing device. Each of client devices 102-106 executes an applicable operating system (e.g., Android or iOS) and facilitates imagery capture/creation via one or more on-device cameras. The techniques described herein can also be used in conjunction with other types of devices, such as gaming consoles, augmented reality devices, quadcopters/drones, observational systems, etc.

Image capture techniques described herein can be incorporated into client devices 102-106 in a variety of ways, including as native functionality and/or through the use of one or more third-party applications or application components (e.g., as obtainable via an applicable network such as network 108 from an applicable repository (e.g., app store 110, examples of which include Google Play, iOS App Store, Windows Store, and Amazon Appstore)).

Figure 2A:
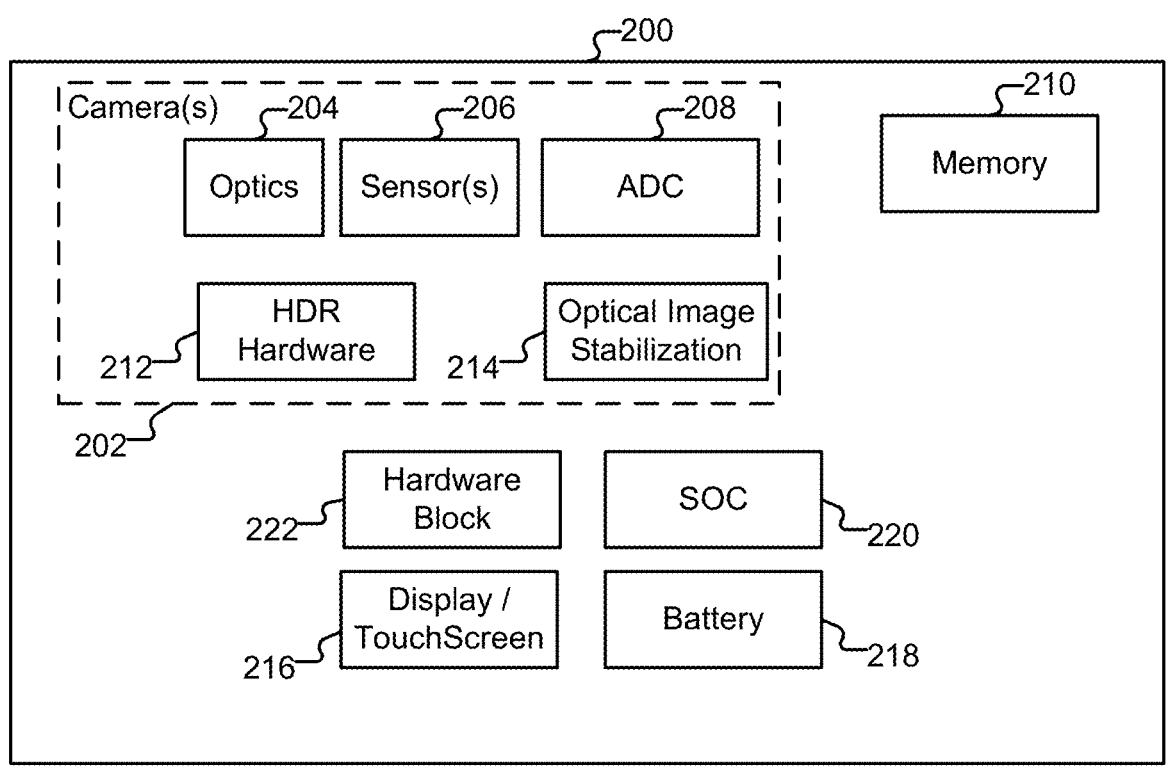
FIG. 2A illustrates example physical components that can be included in embodiments of a device that can be used in accordance with long exposure techniques described herein.

FIG. 2A illustrates example physical components that can be included in embodiments of a device that can be used in accordance with long exposure techniques described herein. Mobile device 200 includes a set of one or more cameras 202 which can comprise respective optics 204 (e.g., camera lenses), sensors 206, analog-to-digital converters 208, etc., in various embodiments. Due to hardware and other constraints (e.g., physical size, safety, and/or waterproofing considerations), camera 202 is limited in its ability to take exposures of up to four seconds. And, some embodiments of camera 202 may only support shorter exposures (e.g., of up to two seconds, or shorter). This is contrasted with traditional photographic equipment which often supports exposures of 30 seconds and longer.

In various embodiments, mobile device 200 includes additional hardware that can be used during the capture of imagery. Examples include HDR hardware 212 and optical image stabilization module 214, which may be present as additional components of cameras 202 and/or may be incorporated into other modules of mobile device 200 (e.g., as part of a system on chip 220 which can also incorporate CPU/GPU/RAM, etc.). Such additional hardware can be leveraged by techniques described herein (e.g., if present on a mobile device) but need not be provided by a mobile device in order to take advantage of techniques described herein. Additional hardware components that are included in embodiments of mobile device 200 include a touch screen 216 and one or more batteries 218.

Imagery captured by camera 202 is provided to memory 210 which is managed by device 200's operating system and mapped to buffers that are handled through frameworks (and can be accessed by application calls, etc., as applicable). Memory 210 can be included within camera 202, provided by SOC 220, or otherwise provided on mobile device 200, including as multiple memories (e.g., due to optimizations). Hardware block 222 can perform real-time image subsampling, e.g., for real-time encoding.

Figure 2B:
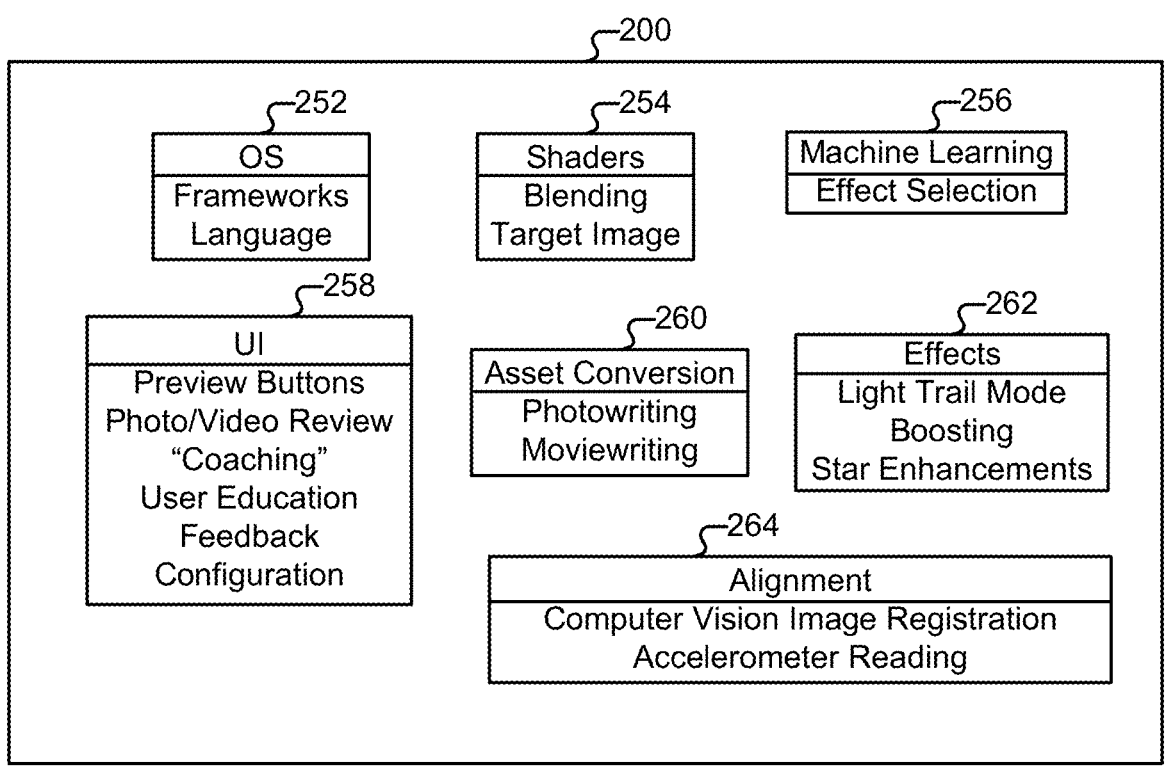
FIG. 2B illustrates example functional/logical components that can be included in embodiments of a device that can be used in accordance with long exposure techniques described herein.

FIG. 2B illustrates example functional/logical components that can be included in embodiments of a device that can be used in accordance with long exposure techniques described herein. Such components of mobile device 200 are generally implementable in a variety of ways, including as a set of one or more scripts (e.g., written in Java, python, etc., as applicable), libraries, application programming interfaces (APIs), modules, etc. Mobile device 200's operating system 252 (e.g., iOS or Android) makes available a set of frameworks which provide for use of/access to various functionality provided by hardware components of mobile device 200. GPU shaders 254 can be written to communicate with such frameworks. Such shaders can be used to generate photographs and also to provide real-time renderings (e.g., via display 216) for preview during photograph creation. Asset conversion system 260 provides functionality for reading and writing photo and movie media and for converting assets. Alignment component 264 provides functionality (e.g., computer vision image registration and/or motion sensor readings) for aligning image frames with a registration image and also providing motion feedback. User interface module 258 provides support for features such as interactive buttons, real-time image previews, user coaching tips/tutorials, etc.

Machine learning module 256 can be used to recommend particular effects/configurations (262) for capturing different kinds of long exposure images. One way to generate such recommendations is to use, as training data (e.g., for a neural network), various example images (e.g., waterfall training imagery, night sky training imagery, fireworks training imagery, selfie portraits with light trails, etc.). While executing application 112, a current context for the long exposure image to be captured can be obtained (e.g., by performing computer vision analysis on an initial frame) and compared against available models to make a recommendation. Such recommendations can include configurations (e.g., frame rate, exposure time, etc.) and artistic choices (e.g., which type of blending mode to use (e.g., averaging)), whether to apply an additional effect (e.g., boosting highlight clipped values), etc.

Functionality described herein as being performed by embodiments of mobile device 200 (e.g., when operated at the direction of an end user hereinafter referred to as "Alice") can be provided/implemented in a variety of ways. Whenever mobile device 200 is described herein as performing a task, a single component, a subset of components, or multiple components of mobile device 200 may cooperate to perform the task. Similarly, whenever a component of mobile device 200 is described herein as performing a task, a subcomponent may perform the task and/or the component may perform the task in conjunction with other components. Further, mobile device 200 can take a variety of forms and, depending on specific implementation, various components and/or features of device 102 may be omitted, provided by other components, and/or and the techniques described herein adapted accordingly. Similarly, additional components/features (not depicted in FIGS. 2A/2B) can be included in embodiments of mobile device 200 as applicable.

Multi-Phase Processing

Figure 3:
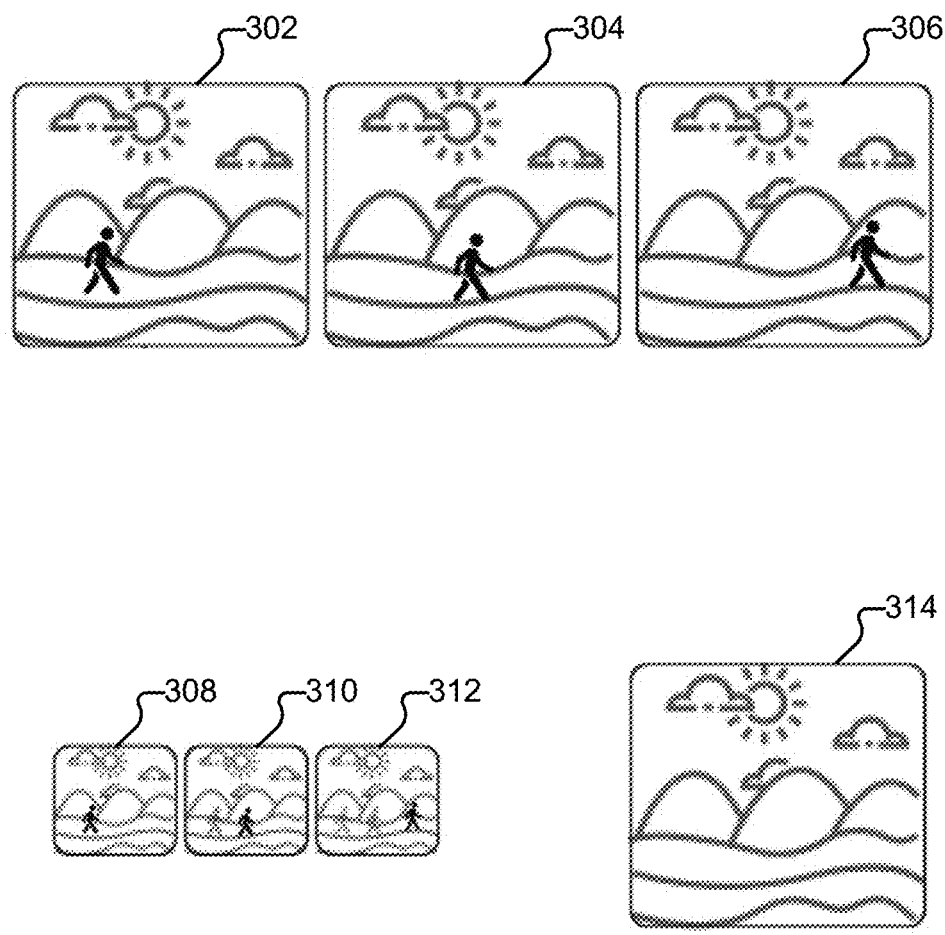
FIG. 3 illustrates the assembly of a set of frames into a long exposure image.

As will be described in more detail below, a single long exposure image can be efficiently created, in real-time, from a series of several individual images. Creation of the long exposure image can occur as a result of three processing phases, each of which can be performed in parallel (including during the capturing of image data) for efficiency. Suppose a user (Bob) would like to capture a long exposure view of a mountain scene on mobile device 104. Unfortunately, another individual (Charlie) is walking through the scene that Bob would like to capture. By blending multiple short exposures together, Bob will be able to capture the scene while minimizing Charlie's presence. A simplified example is shown in FIG. 3. A series of frames 302-306 depict the mountain scene that Bob would like to capture, as well as Charlie walking through the scene. Each of the frames represents a snapshot in time of the scene, as Charlie happens to walk through it, and can be individually processed and blended together, in real-time, into a single long exposure image. As will be described in more detail below, as each frame arrives (e.g., with frame 304 arriving after frame 302), it can be processed and blended into a result of the previously blended frames. In a simplified example, suppose only a total of three frames (frames 302-306) is captured. Region 308 depicts a blended long exposure after frame 302 has arrived and been processed. Region 310 depicts a blended long exposure after frame 304 has arrived and been processed. Note that in region 308 (where the blended image comprises only frame 302) Charlie is prominent, however, as additional frames are processed (e.g., as frames 304 and 306 are received and processed), Charlie's presence in the long exposure appears to ghost. In a long exposure blending frames 302-306 together, aspects common to all frames (e.g., the mountains and clouds) will appear more strongly than dynamic elements (which will fade out). Given enough frames (e.g., 90 frames instead of the example 3 frames), the presence of Charlie during filming will be mitigated (e.g., as shown in long exposure image 314 in which Charlie is effectively absent).

Phase 1: Image Acquisition

A single long exposure can be created from a set of many individual shots that are sharp. As an example, a single long exposure can be created from a sequence of 90 images. The specific number of shots used in forming the long exposure can vary, such as based on the type of scene (e.g., waterfall vs. star trail) and heuristics that impact the risk of shakiness. As examples, if a wider angle (e.g., 35 mm) lens is used, individual $\frac{1}{35}$ exposures may be preferable. If a narrow angle (e.g., 50 mm) lens is used, individual $\frac{1}{50}$ exposures may be preferable. Other heuristics can include motion data from the device accelerometer and performing an assessment of sharpness of previously (recently) taken photos.

One way of acquiring the set of images from which a single long exposure can be created is to make multiple (e.g., 90) "capture" calls on mobile device 200's system photography APIs. On iOS, this is the "AVCapturePhotoOutput" class, and allows for the specification of information image formats, whether to use flash, etc. Such an approach also has drawbacks, namely, it can introduce latency and resource pressure, and trying to perform a sequence of 90 capture calls could cause gaps in the imagery data.

An alternate approach to capturing a set of images from which a single long exposure can be created is to use mobile device 200's system video APIs, treating each video frame as a still photo. On iOS, this is the "AVCaptureVideoDataOuput" class. This API provides a slightly lower quality image and is more limited than the AVCapturePhotoOutput. However, it can reliably deliver a set of 30 frames per second (or more), with some mobile devices capable of capturing video at 60 FPS, 120 FPS, or faster. In general, using 30 FPS will result in the highest quality long exposure, while other frame rates may sacrifice resolution. A faster frame rate and shorter exposure time can be selected if applicable, such as where a telephoto lens is being used. For example, 60 FPS at $\frac{1}{60}$ can be used in conjunction with a long exposure that makes use of the 2× zoom lens of the iPhone X. Related to framerates is exposure time. In various embodiments, a long exposure time is selected to line up with the frame rate to ensure minimal gaps in motion between frames. As an example, at 30 frames per second, an exposure of $\frac{1}{30}$ (per second) can be used. Additional information such as the system recommended exposure can be used when determining a frame rate. Suppose the system recommended exposure is 1/120 at ISO 400. The shutter speed can be adjusted to match the target frame rate of 1/30, which is a change of two exposure stops. The ISO can be compensated by moving from ISO 400 to ISO 100. If hardware ISO limitations apply (e.g., mobile device 200 supports a minimum ISO of ISO 200), the shutter speed can be adjusted if needed (e.g., a shutter speed of $\frac{1}{60}$). A higher quality image (e.g., one that contains less noise) can be achieved by creating a long exposure image from multiple frames (each captured at a lower ISO) when compared to a single image captured at a faster exposure with a higher ISO.

Phase 2: Alignment

While each of the individual images captured during phase 1 may be sharp, a single long exposure assembled from a set of such images may appear blurry (without additional processing) due to camera movements that occur as images are captured. Over the course of a handheld long exposure, the photographer's arm will very likely have shifted (e.g., as a slow drift in a particular direction as the user's arm gets tired, or as random hand movements due to medical or other factors such as the user being on a boat).

One way such movement during capture can be mitigated is by aligning the images before blending/merging them. As an example, a "target" image from the set can be selected to serve as a reference frame, and all other images can be aligned against the target image to best overlap with it (e.g., by computing an affine transformation matrix for mapping the arriving image to the registration image, applying a plurality of transformation matrixes, etc.). Determining which image should be used as the target image can be performed in a variety of ways. As one example, the first frame that arrives after capture begins can be designated as a default target image, and all other images can be aligned using it. Other selection criteria can also be used, e.g., by allowing the user to select the target image, or by the target image being selected based on the type of scene being captured. As yet another example, the frame most level with the ground (or another applicable reference point) with a portion of frames received after the capture button has been pressed (e.g., most level frame within initial frames) can be selected. As described in more detail below, during optional post-processing, a different target image can also be selected and used retroactively (e.g., to reprocess the result into a new long exposure image).

Some embodiments of mobile device 200 will have more sophisticated hardware that can be leveraged (if available) for performing image alignment in accordance with processing performed during phase two. For example, computer vision APIs can be used to abstract away image registration techniques by determining the broad movement of the image sequence. In iOS, the system's "Vision" framework includes APIs for homographic or translational image registration, the "VNHomographicImageRegistrationRequest" and "VNTranslationalImageRegistrationRequest." Either API can be used in accordance with techniques described herein. In other devices, tools such as the OpenCV open-source framework or other appropriate frameworks can be used.

Image alignment can be a computationally expensive process. While some (e.g., higher-end, more modern) mobile devices might be able to perform alignments on all frames in real-time, some less powerful devices may not be able to keep up. This can lead to a slow experience and if enough frames are backed-up, application 112 may crash or other undesirable behavior may occur as a result. Similarly, if an incoming call is received (even on a high-end mobile device), while a long exposure image is being captured, the operating system of the mobile device may limit available resources to application 112. Operating under such reduced resources (while still capturing the long exposure) can be a more desirable option than forcing the user to re-take the photograph. In various embodiments (e.g., for use with mobile devices that are resource constrained), only some of arriving frames are aligned with the registration image. For example, the device's motion sensors can be used to detect whether significant movement has occurred between frame arrivals, and if significant movement has not occurred, the most recent alignment information can be reused (e.g., as the affine transformation matrix) rather than recomputing a new alignment. Generally, the fewer frames that are skipped during alignment, the better will be the final result. However, on very old devices, a sampling-based approach (e.g., reusing the transformation matrix of previous frame(s)) can nonetheless yield a reasonably sharp image (e.g., even where only one in six frames has a new transformation matrix computed). In some embodiments, if more than a threshold number of frames are skipped or otherwise not processed (e.g., fewer than 85% of the expected frames in a given exposure), additional frames are collected by the camera and processed until the long exposure can be completed. As an example, suppose a user intends to take a five second exposure (and such a captures is underway) but three second into the exposure, the user sneezes, resulting in period where several of the received frames (e.g., between seconds 3 and 4) cannot be successfully aligned with the reference image. If the user is able to recover from the sneeze and subsequently received frames align to the reference image within the tolerance, Application 112 can cause such additional frames to be captured and processed to complete the originally planned sequence.

Another approach to reducing the resource burden of alignment is to shrink the arriving frames to a smaller size before performing alignment. If an image is ¼ the resolution, it will have ¼ of the data to process (and take ¼ of the time). This is another tradeoff, as the alignments themselves may be less accurate. The final image (i.e., used for blending) can make use of the originally captured frames to preserve final image resolution.

Phase 3: Merge

In various embodiments, a GPU, which allows for massively parallel operations on pixels, is used to merge aligned images in real-time. For example, a compute shader can be used in conjunction with techniques described herein to blend images together. One potential resource constraint is the memory requirements of working with hundreds of images at once. A twelve megapixel color image requires approximately 50 megabytes of RAM. One hundred of those would be about five gigabytes. A typical commodity mobile device might have fewer than two gigabytes of memory.

One approach to mitigating RAM limitations is to use a single image buffer as a rendering target. As each new video frame in the set is captured and passed into the render pipeline, a fraction of its value is added to the buffer. As an example, if it is known in advance that the long exposure will be made up of 100 individual frames, then an approach for the compute shader is as follows:

T=Pixel in Target Image
C=Pixel in Current Video Frame
For each frame, T=T+(0.01*C)

For maximum precision when working with many floating point values, a 64-bit image can be used. A twelve megapixel image would require approximately 100 mb of memory. With a queue of a few incoming images, the system only has to use a few hundred megabytes of memory. This is much more manageable than the 5 gigabytes of a naive implementation.

Different merging techniques (also referred to herein as "blend modes") can be used for different long exposure effects, and can be based on factors such as available computing resources as applicable. An example merging technique is to create a final image as a mean (or average) of all of the pixels of each of the arriving frames' aligned pixels. Examples of blend modes include a "lighten blend" in which (in a stack of aligned images) those pixels having brighter values are preferentially used in the final image over those pixels having darker values (for a given pixel position within the image). In an alternate approach, the first frame can be used to initially fill the buffer 100%. As additional frames are received, the pixels included in those frames gradually replace the data buffer.

Optional Phase 4: Post Processing

One advantage to using various techniques described herein is that because the long exposure image is created on a mobile device in real-time, a real-time preview can be provided as output while frames are captured and blended, allowing the user to see how the process is going, and as applicable, make changes during capture (e.g., holding the mobile device more steady, reframing the subject during capture, etc.).

While post-processing is not necessary to perform long exposure photography using techniques described herein, for certain types of photography, the user may choose to apply additional post processing techniques (e.g., for artistic reasons). As one example, long exposure images captured using techniques described herein may comprise pixels having a more limited dynamic range than would be captured through traditional long exposure techniques. In a traditional long exposure photograph, pixels where bright light was passed through the scene will appear significantly brighter than pixels not subjected to such light. Without performing additional post processing, the brightness values of such pixels using the techniques described herein will be less noticeable (e.g., due to the averaging of clipped highlight values). Two example ways of approximating the phenomenon of traditional long exposure into a real-time digital long exposure are as follows. One solution is to keep a separate frame buffer that keeps track of the brightest pixels over every region of the image, for the duration of the long exposure process. This lighten layer can then be blended in with the long exposure generated during phase 3. This will allow the final long exposure to represent both a blended average of all of the received frames, while also preferentially preserving any particularly bright frames over those average values. Another technique is to boost the brightness of any clipped highlight pixel values obtained during phase 2. For example, if a given pixel has its RGBA values clipped (e.g., at 1.0,1.0,1.0), higher pixel values (e.g., at 2.0, 2.0, 2.0) can be used during merge (boosting the brightness values of those particular pixels during blending operations). Additional post-processing can also be performed, such as by applying a Gaussian blur to the long exposure image.

Example Process

Figure 4:
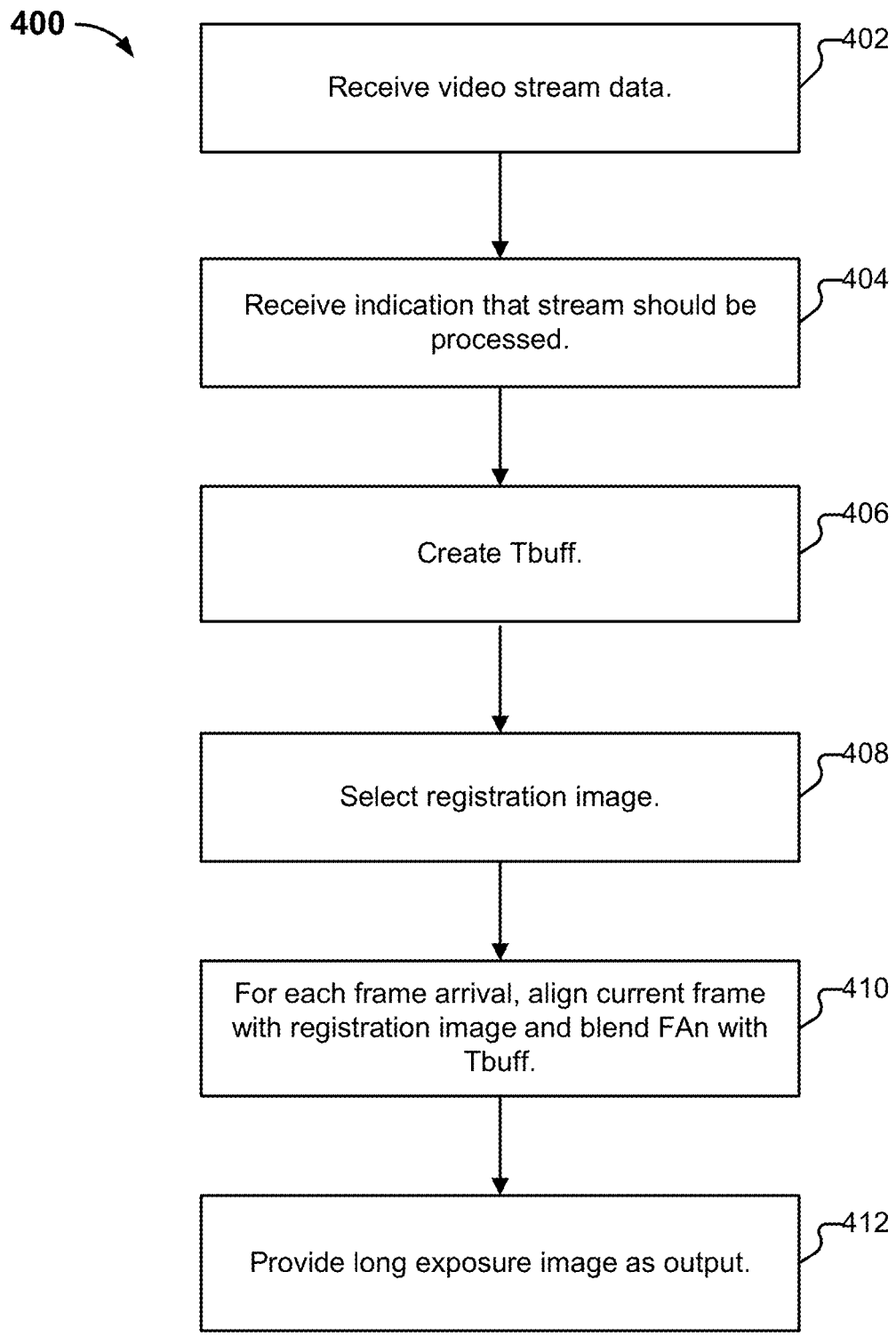
FIG. 4 illustrates an embodiment of a process for generating a long exposure image on a mobile device.

FIG. 4 illustrates an embodiment of a process for generating a long exposure image on a mobile device. In various embodiments, process 400 is performed by mobile device 102. The process begins at 402 when video stream data is received (e.g., as a constant stream of video frames which are translated into image buffers in memory).

As one example of the processing performed at 402, suppose Alice is on a hike and would like to take a long exposure photograph of a water fall in which the flowing water appears smooth. Alice opens a photography application 112 on mobile device 102, which causes camera 202 to begin making available real-time image data to application 112, including as a real-time preview image.

As applicable, an appropriate frame rate and shutter speed are selected, and a number of total frames for processing is selected. This configuration can be performed in a variety of ways. In one example, a default setting (e.g., 30 frames per second, at an exposure of $\frac{1}{30}^{th}$ of a second, for a total of three seconds, resulting in 90 frames) is selected by default for all long exposure images. The user can modify default settings if desired, such as through interacting with controls made available in a user interface. In another example, an appropriate configuration can be selected in response to the user specifying a particular type of scenario. For example, if Alice indicates that she wishes to capture a water feature, appropriate configuration settings can be selected. If Alice instead indicates that she wishes to remove tourists from a photograph of a scenic spot, an exposure of nine seconds can be selected (e.g., capturing 270 frames). If Alice indicates that she would like to capture a night scene and incorporate a light trails effect, a nine second exposure can similarly be selected during configuration and any additional buffers necessary for augmenting the light trails in the final image can be created and configured as well. In various embodiments, an appropriate configuration is automatically selected for the user based on contextual information. For example, at 402 when video stream data is received from camera 202, application 112 can infer a scene type (e.g., water scene, night scene, high contrast scene where highlight clipping compensation should be applied, etc.), such as by using computer vision analysis, and automatically select as an appropriate configuration for the scene.

At 404, an indication that the stream should be processed is received. Such an indication can be received at 404 when Alice selects a "begin capture" or similar button provided by application 112 in an interface (or interacts with mobile device 102 via a voice command). In response to receiving the indication at 404 (or at another appropriate time, such as upon the startup of application 112), mobile device 102 creates (at 406) a set of working buffers including a target video buffer ("TBuff") for the purpose of writing the final image and (e.g., if additional effects have been selected) any additional buffers that will be used in final image creation. As one example, if the user would like to apply a light trail effect, additional information about particularly bright pixels observed in the stream can be maintained in a light trail buffer (and used, e.g., in an additional blend operation with the data stored in TBuff). In this scenario, two versions of the long exposure are created in parallel during processing, a default long exposure (in TBuff) and a light trail buffer which can be blended in a final step. Maintaining multiple buffers also allows the user to see a live preview of effects, and ultimately decide whether or not they should be applied. The buffers will be used to store the first frame of the sequence, the current frame number, the target long exposure image as it is being built, and any other data that could be useful to track during the course of creating the long exposure image. Where the user is taking a selfie, a dedicated buffer can be used to maintain the frame having the sharpest facial image and blending can preferentially incorporate facial pixels (e.g., using computer vision techniques) from that buffer when generating a final long exposure image (e.g., by applying more weight to any such pixels).

At 408, a registration image is selected. As mentioned above, the registration image is used to align each of the frames used in creating the long exposure image. During capture, when a frame arrives from the camera, a check can be performed of the number of frames that have been processed so far in the long exposure. If this is the first frame since the capture started, that frame can be saved to the working buffer for alignment purposes as the registration image.

At 410, arriving frames (e.g., $Fa_1, \ldots Fa_n$) are processed in real-time. For example, at 410, they are aligned with the registration image, and blended (e.g., using GPU shaders) into the buffer.

Finally, at 412 (e.g., once the expected number of arriving frames has been processed), a long exposure image is provided as output. The output can be generated by converting the buffer contents into a JPEG, HEIC, etc., and can be written to the user's photo library using an appropriate system call/framework/etc. As mentioned above, while processing is occurring, the current state of TBuff can be displayed to the user as a preview. Further, in addition to providing a single long exposure image as output at 412, additional (optional) post processing can be performed, e.g., applying light trail or other effects. Further, in various embodiments, in addition to providing a single image as output at 412, the user can be provided with an optional movie file that links each of the frames processed at 410 into a video clip (e.g., showing the evolution of TBuff) as additional frames are captured and blended. In various embodiments, the user is provided with the option to export the individual frames and re-process them. In an example scenario, a user taking a long exposure selfie (e.g., with a waterfall in the background) may, upon review of the finished long exposure, wish to select a different registration frame (e.g., one which includes a more flattering expression). A new long exposure image can be created by repeating applicable portions of process 400.

Providing Feedback

The process of capturing and generating a long exposure image using techniques described herein will typically take at least a few seconds. As an example, where Alice chooses to take a long exposure image of a waterfall, capturing and processing enough frames (e.g., 90 frames) may take approximately three seconds after Alice selects a "capture image" button. Alice can be provided with a variety of feedback (e.g., via app 112) while capturing/processing is underway.

One piece of feedback that can be provided is the estimated time remaining on the creation of the long exposure. The information can be provided as a percentage (e.g., 85% complete) and can also be provided as a number of remaining frames (e.g., "completed 34 frames of 90") or in another appropriate manner.

Another piece of feedback that can be provided is a real-time preview. As more arriving frames are blended into the exposure, the current state of the long exposure can be shown (as if the long exposure had ended in that moment). This lets the user know information such as whether the image has become too blurry, or if there has been a miscalculation in the long exposure, ruining the image, during capture (e.g., allowing the user to abort the process instead of wasting additional seconds on a problematic capture). Similarly, if the user is happy with the image-in-progress, the user can elect to end processing early (e.g., ending a 9 second exposure at 4 seconds) and save the result (without bothering to capture/process the additional five seconds worth of frames).

Another type of feedback that can be provided to the user is an indication of how "shaky" the camera is. If the user's arm is moving too much (and the arriving frames are outside a threshold ability to be aligned with the registration image), then the camera will capture blurry frames which cannot be stabilized (e.g., despite use of techniques described herein). In various embodiments, application 112 provides a shakiness indicator, and encourages users by showing "STABLE" when the device is adequately stable (e.g., a threshold number of frames of the long exposure sequence are within a sufficient tolerance of the registration image). Additional information can also be provided to the user, such as suggesting the user retake the picture while attempting to be 20% more steady (e.g., by bracing the user's arm).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive, in response to calling a video capture application programming interface (API) of a device, real-time video stream data, wherein the real-time video stream data comprises a plurality of arriving frames captured as video data, having a predetermined framerate, during a video recording operation on the device;
   receive an indication that the received real-time video stream data should be processed into a single long exposure image;
   in response to a frame arrival, attempt to align a current frame with a registration image;
   determine, based at least in part on the attempt to align the current frame with the registration image, that feedback should be provided to a user pertaining to creation of the long exposure image and provide the feedback as live feedback to the user during at least a portion of the creation of the long exposure image; and
   a memory communication interface coupled to the processor and configured to provide the processor with instructions.

2. The system of claim 1, wherein the feedback provided to the user comprises motion feedback.

3. The system of claim 2, wherein the motion feedback is based at least in part on whether a threshold number of frames have been received that are within a sufficient tolerance of the registration image.

4. The system of claim 1, wherein the feedback provided to the user comprises a real-time preview of the long exposure image, using a current state of a single image buffer that blends a plurality of aligned frames.

5. The system of claim 4, wherein the processor is further configured to end creation of the long exposure image early in response to a user indication that the real-time preview is satisfactory in the current state.

6. The system of claim 1, wherein the feedback provided to the user comprises an estimated time remaining on completion of the long exposure image.

7. The system of claim 1, wherein the processor is further configured to blend the aligned frame with a buffer and to use the buffer to provide the long exposure image as output.

8. The system of claim 1, wherein the processor is further configured to select the registration image.

9. The system of claim 1, wherein aligning the current frame with the registration image includes using a transformation matrix.

10. The system of claim 1, wherein aligning the current frame with the registration image includes using accelerometer information to determine whether a previous alignment should be used.

11. The system of claim 10, wherein aligning the current frame with the registration image includes determining that an alignment tolerance has been exceeded and a new alignment should be used.

12. The system of claim 1, wherein blending the aligned frame with the buffer includes selecting a blend mode from a plurality of blend modes.

13. The system of claim 12, wherein the blend mode is selected based on a scene type.

14. The system of claim 13, wherein the scene type is user selected.

15. The system of claim 13, wherein the scene type is automatically selected by applying a model to an initial image.

16. The system of claim 1, wherein the feedback provided to the user comprises a status of the long exposure image during processing.

17. The system of claim 16, wherein the status includes a completion indication expressed in a number of frames.

18. A method, comprising:
   receiving, in response to calling a video capture application programming interface (API) of a device, real-time video stream data, wherein the real-time video stream data comprises a plurality of arriving frames captured as video data having a predetermined framerate, during a video recording operation on the device;
   receiving an indication that the received real-time video stream data should be processed into a single long exposure image;
   in response to a frame arrival, attempting to align a current with a registration image; and
   determining, based at least in part on the attempt to align the current frame with the registration image, that feedback should be provided to a user pertaining to creation of the long exposure image and providing the feedback as live feedback to the user during at least a portion of the creation of the long exposure image.

19. The method of claim 18, wherein the feedback provided to the user comprises motion feedback.

20. The method of claim 19, wherein the motion feedback is based at least in part on whether a threshold number of frames have been received that are within a sufficient tolerance of the registration image.

21. The method of claim 18, wherein the feedback provided to the user comprises a real-time preview of the long exposure image, using a current state of a single image buffer that blends a plurality of aligned frames.

22. The method of claim 21, further comprising ending creation of the long exposure image early in response to a user indication that the real-time preview is satisfactory in the current state.

23. The method of claim 18, wherein the feedback provided to the user comprises an estimated time remaining on completion of the long exposure image.

24. The method of claim 18, further comprising blending the aligned frame with a buffer and to use the buffer to provide the long exposure image as output.

25. The method of claim 18, further comprising selecting the registration image.

26. The method of claim 18, wherein aligning the current frame with the registration image includes using a transformation matrix.

27. The method of claim 18, wherein aligning the current frame with the registration image includes using accelerometer information to determine whether a previous alignment should be used.

28. The method of claim 27, wherein aligning the current frame with the registration image includes determining that an alignment tolerance has been exceeded and a new alignment should be used.

29. The method of claim 18, wherein blending the aligned frame with the buffer includes selecting a blend mode from a plurality of blend modes.

30. The method of claim 29, wherein the blend mode is selected based on a scene type.

31. The method of claim 30, wherein the scene type is user selected.

32. The method of claim 30, wherein the scene type is automatically selected by applying a model to an initial image.

33. The method of claim 18, wherein the feedback provided to the user comprises a status of the long exposure image during processing.

34. The method of claim 33, wherein the status includes a completion indication expressed in a number of frames.

35. A computer program product embodied in a non-transitory computer readable storage medium and comprising computer instructions for:
receiving, in response to calling a video capture application programming interface (API) of a device, real-time video stream data, wherein the real-time video stream data comprises a plurality of arriving frames captured as video data, having a predetermined framerate, during a video recording operation on the device;
receiving an indication that the received real-time video stream data should be processed into a single long exposure image;
in response to a frame arrival, attempting to align a current with a registration image; and
determining, based at least in part on the attempt to align the current frame with the registration image, that feedback should be provided to a user pertaining to creation of the long exposure image and providing the feedback as live feedback to the user during at least a portion of the creation of the long exposure image.

* * * * *